United States Patent [19]

Pesch

[11] 4,336,008

[45] Jun. 22, 1982

[54] ADJUSTABLE SPACER ASSEMBLY FOR PLATEN PRESS

[75] Inventor: Jürgen Pesch, Krefeld-Traar, Fed. Rep. of Germany

[73] Assignee: G. Siempelkamp GmbH & Co., Krefeld, Fed. Rep. of Germany

[21] Appl. No.: 207,429

[22] Filed: Nov. 17, 1980

[30] Foreign Application Priority Data

Nov. 17, 1979 [DE] Fed. Rep. of Germany ....... 2946468

[51] Int. Cl.³ ................................................ B29C 3/00

[52] U.S. Cl. .................................................... 425/406

[58] Field of Search ............ 425/338, 339, 406, 451.7, 425/DIG. 221, DIG. 129

[56] References Cited

U.S. PATENT DOCUMENTS

| | | | |
|---|---|---|---|
| 2,001,305 | 5/1935 | Gorhams et al. | 425/338 X |
| 2,370,622 | 3/1945 | Gastrow | 425/451.7 X |
| 3,743,469 | 7/1973 | Gibbons | 425/451.7 X |
| 3,826,601 | 7/1974 | Huitter | 425/406 X |
| 3,860,381 | 1/1975 | Pesch | 425/406 X |

FOREIGN PATENT DOCUMENTS

| | | |
|---|---|---|
| 1216532 | 10/1967 | Fed. Rep. of Germany . |
| 2027806 | 1/1971 | Fed. Rep. of Germany . |

*Primary Examiner*—J. Howard Flint, Jr.
*Attorney, Agent, or Firm*—Karl F. Ross

[57] ABSTRACT

A platen press has a pair of platens having respective confronting and parallel pressing surfaces and each having a pair of longitudinal edges. Respective spacer bars are fixed to the longitudinal edges of one of the platens and have respective spacer surfaces parallel to and between the platen surfaces. Respective adjustment bars are secured to the longitudinal edges of the other of the platens and each have an adjustment surface parallel to and confronting the respective spacer surface. Each of these adjustment bars is formed of an outer wedge having a pair of nonparallel faces one of which is the respective bar surface and of an inner wedge having an outer face flatly engaging the other face of the respective outer wedge. The inner and outer wedges can be relatively longitudinally displaced so as to displace the respective abutment face perpendicular to the respective platen surface. Thus when the platens are displaced together perpendicular to the surface the spacer surface flatly engages with the respective adjustment surface, holding the pressing surfaces apart at a distance equal to the thickness of the spacer bar plus a finish increment set on the adjustment bar.

2 Claims, 3 Drawing Figures

ADJUSTABLE SPACER ASSEMBLY FOR PLATEN PRESS

FIELD OF THE INVENTION

The present invention relates to an adjustable spacer assembly for a platen press. More particularly this invention concerns a platen press of the type used to produce plywood, pressed board, particle board, and the like.

BACKGROUND OF THE INVENTION

In the production of plywood, particle board, pressed board, and the like as described in U.S. Pat. No. 3,860,381 it is standard practice to use a platen press having a pair of platens with confronting parallel pressing surfaces. The mat or sandwich to be pressed into the desired workpiece is laid on the upper pressing surface of the lower platen and the two normally heated platens are brought together to compress this mat or sandwich to the desired extent.

Normally the spacing between the two surfaces of the press platens is strictly controlled by means of spacer bars that normally are provided at the edges of the platens. These bars, which are fixed to one of the platens, engage the other platen when the press is closed so as to maintain a predetermined distance between them. This distance in turn corresponds to the desired board thickness plus a relatively short distance equal to the so-called finish increment. This finish increment is normally subsequently removed by surface-treating the board. Under any circumstance this finish increment must be very exactly established, normally to an accuracy of tenths of millimeters.

Normally the spacer bars are provided for establishing this board thickness plus the finish increment. Thus it is necessary that each press is provided with an entire set of very closely dimensioned spacer bars, and that each time the pressing operation is changed the spacer bars are switched for other spacer bars. The amount of spacer bars necessary is equal to the number of different board thicknesses times the number of different finish increments times the number of spacer bars per platen. Thus it is necessary to provide an enormous and relatively expensive stock of such spacer bars.

It has been suggested in German patent publications Nos. 1,216,532 and 2,027,806 to eliminate these different spacer bars and provide a wedge-type adjustable spacer bar. Such a spacer bar is formed by a pair of wedges which are fitted together to form an adjustment bar having parallel outer surfaces, but with the wedges engaging each other at a surface that is inclined to these parallel outer surfaces. Means such as a threaded spindle is provided for displacing one of these wedges relative to the other to vary the overall thickness of the spacer bar. Since, however, the average board thickness varies between 5 and 30 mm, whereas the average finish increment must be adjusted to a tenth of a millimeter, it is relatively difficult with such a system to set the wedge-type spacer bar at the exact desired dimension. Due to the relatively steep angle necessary on the inclined plane between them a considerable vector of force is effective during pressing against the adjustment mechanism, which force frequently maladjusts it and caused the workpieces to be made substantially thinner than is desired. As a result this type of system has found little wide-range use and, even when used, requires continuous monitoring of board thickness to ensure that it has not maladjusted itself.

OBJECTS OF THE INVENTION

It is therefore an object of the present invention to provide an improved platen press.

Another object is to provide an improved adjustable spacer assembly for a platen press.

Yet another object is to provide such a spacer assembly which largely eliminates the need to stock a great number of differently dimensioned spacer bars.

SUMMARY OF THE INVENTION

These objects are attained according to the instant invention in a platen press of the above-described general type, but wherein one of the platens is provided in customary fashion with spacer bars along its longitudinal edges, with the spacer surfaces of these bars extending parallel to and lying between the platen surfaces. Adjustment bars are provided secured to the longitudinal edges of the other platen and each have an adjustment surface parallel to and confronting the respective spacer surface. According to the invention each of these adjustment bars is formed of an outer wedge having a pair of nonparallel faces one of which is the respective bar surface and of an inner wedge having an outer face flatly engaging the other face of the respective outer wedge. Means is provided for relatively longitudinally displacing the inner and outer wedges and locking them at any of a multiplicity of longitudinally offset positions so as to displace the respective adjustment face perpendicular to the respective platen surface.

The instant invention is based on the fact that the finish increment which, although it must be adjusted very finely, normally lies within a very close range for all types of boards. Thus the wedge-type adjustment bar according to the invention serves only to adjust the finish increment. The spacer bars themselves determine the board width which normally is one of several standard widths, so that in reality only a limited number of spacer bars are needed. Since the wedge-type adjustment bar only serves for fine adjustment over a very narrow range, the angle formed by its inclined plane can be extremely acute, so that any component of force will be so greatly attenuated as to be unable to overcome sliding friction, much less any locking force applied by an adjustment mechanism.

With the system according to the instant invention it is therefore possible to provide a spacer bar which determines the board thickness, and then set the finish increment separately. Since the finish increment does not change so long as the type of board being produced remains the same, it is therefore possible to produce boards of different thicknesses without resetting the adjustment bar. This is due to the fact that a relatively thin board of a certain type has the same increment as a relatively thick board of the same type, as the increment merely is determined by how much material is sanded off the board after it has been pressed.

According to the invention the spacer bars are provided with dovetail-section bases received in corresponding dovetail formations of the platens so that they can readily be slipped out and replaced.

SPECIFIC DESCRIPTION

Figure 1:
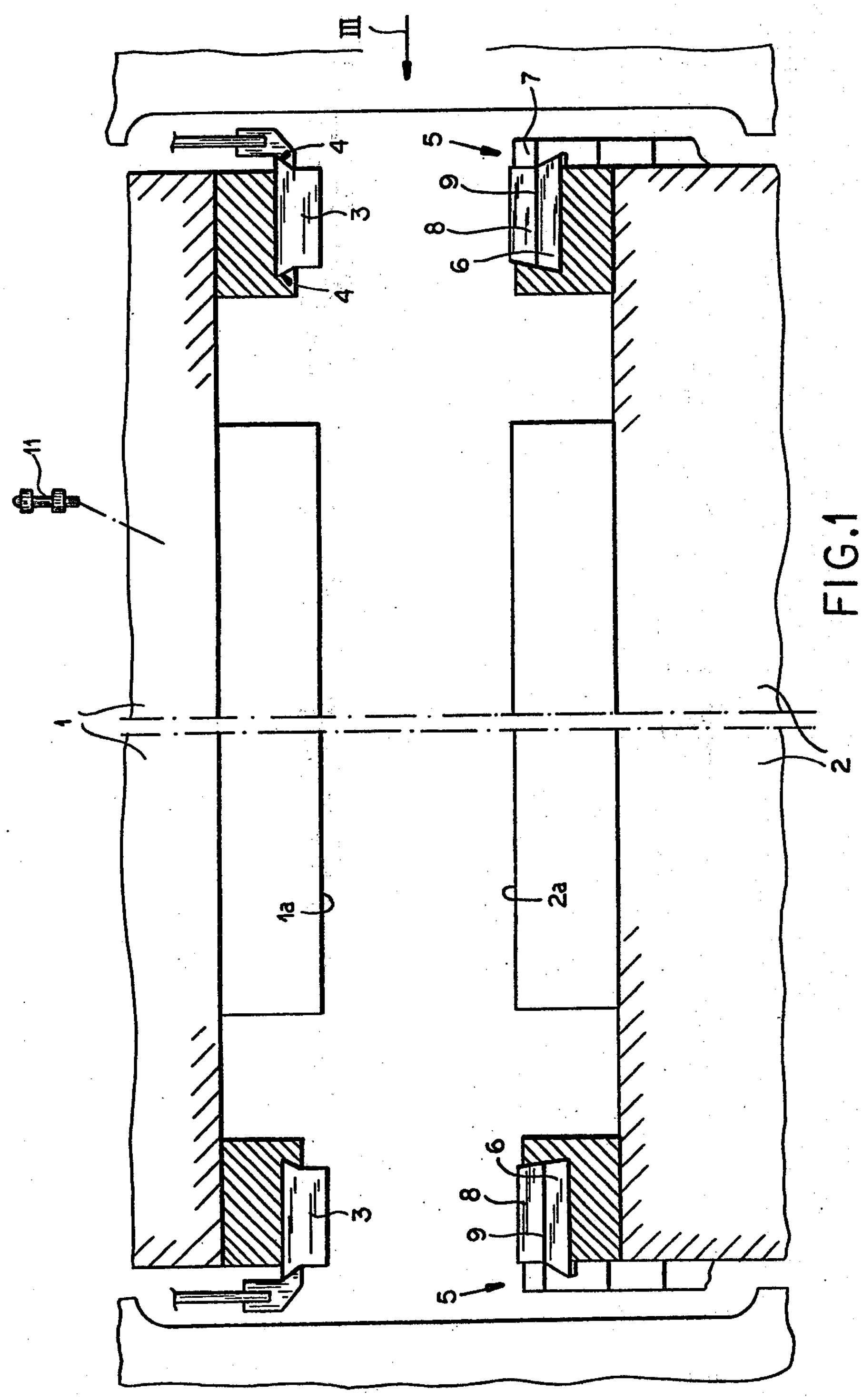
FIG. 1 is a cross section through a press according to the instant invention.
Figure 2:
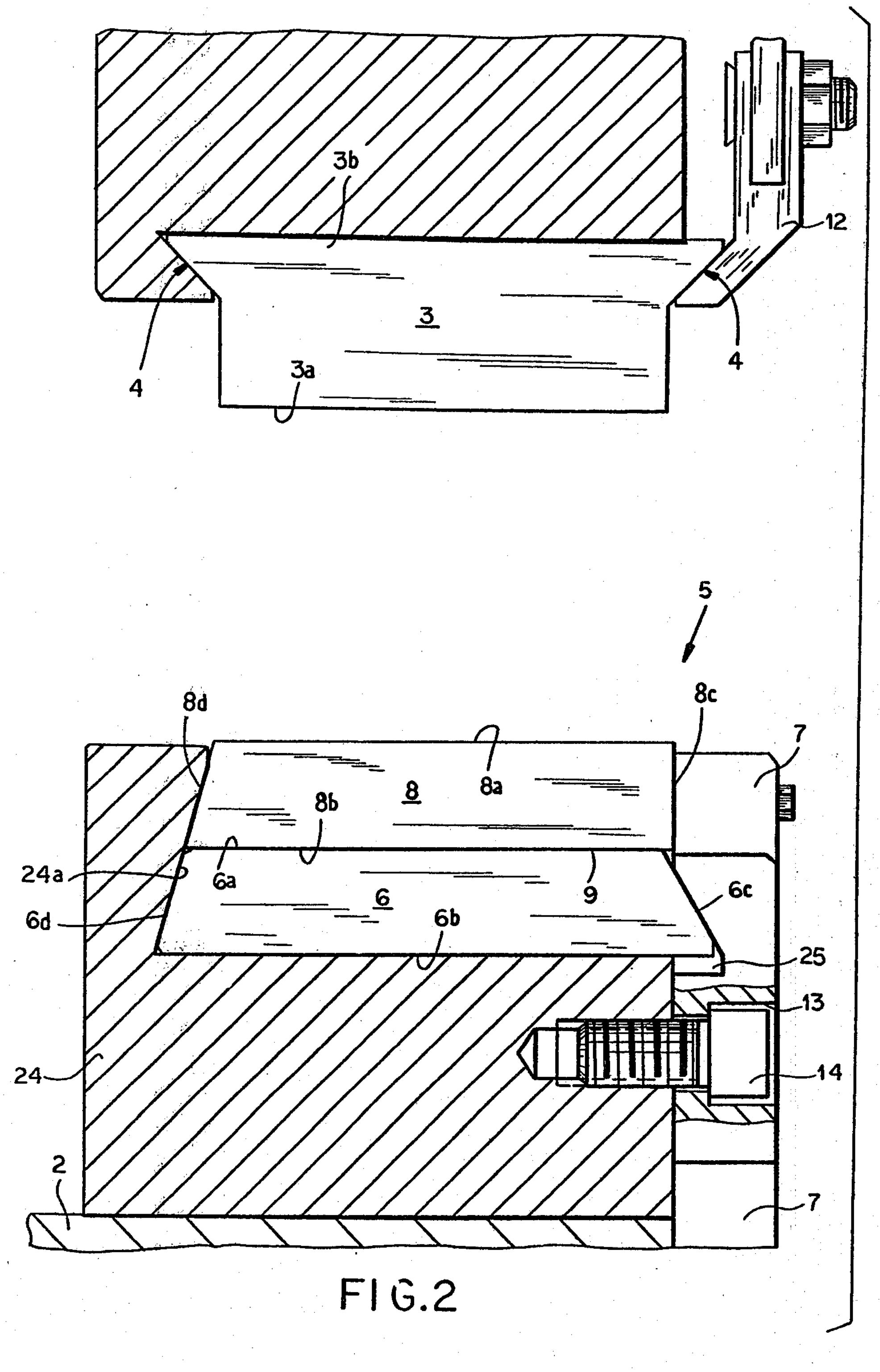
FIG. 2 is a large-scale view of a detail of FIG. 1.
Figure 3:
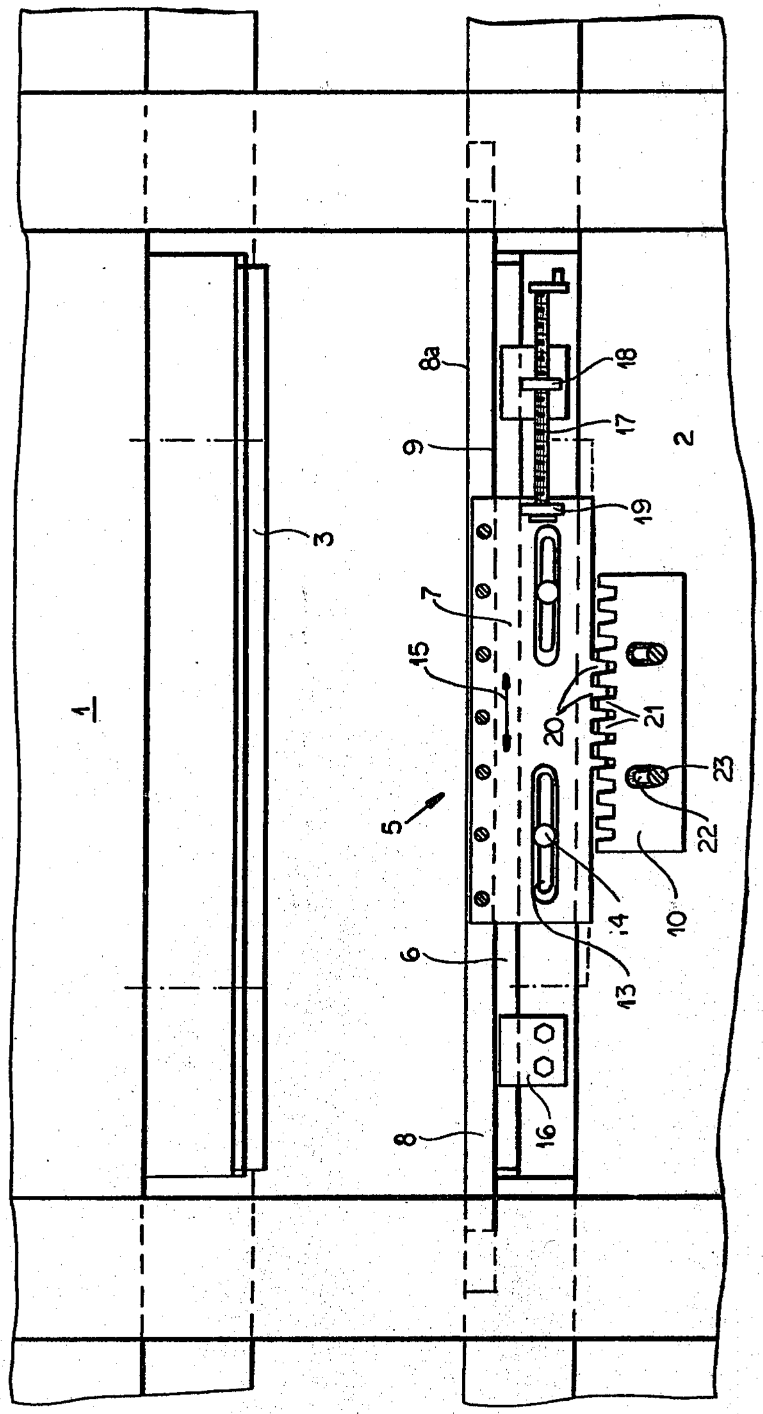
FIG. 3 is a view taken in the direction of arrow III of FIG. 1.

As shown in FIGS. 1-3 a single-stage platen press according to the invention has an upper platen 1 displaceable by means of a schematically illustrated hydraulic cylinder 11 relative to a lower platen 2. The upper platen 1 has a lower pressing surface 1*a* that is parallel to an upper pressing surface 2*a* of the lower platen 2.

Along each of its longitudinal edges the upper platen 1 is provided with a spacer bar 3 having a lower spacer surface 3*a* and a dovetail-section base 3*b* received in a dovetail-section groove 4 of the upper platen. A clamping arrangement 12 is provided for releasably holding each of the spacer bars 3 in the respective holding groove 4.

The lower platen 2 is provided along each of its longitudinal edges with an adjustment bar 5 comprised of an upper wedge 8 having an upper surface 8*a* and a lower surface 8*b* and a lower wedge 6 having an upper surface 6*a* and a lower surface 6*b*. The two surfaces 6*a* and 6*b* lie flatly against each other at a plane 9 that is inclined at a few degrees to the surfaces 1*a*, 2*a*, 3*a*, 8*a*, and 6*b*. The lower surface 6*b* sits on a corresponding surface of the lower platen 2 that is parallel to the surfaces 1*a* and 2*a*.

The upper wedge 8 is bolted to a plate 7 formed with longitudinally extending slots 13 in which fit T-head bolts 14 permitting the upper wedge 8 to be displaced longitudinally relative to the lower wedge 6 as indicated by arrow 15. The lower wedge 6 is held in place by plates 16 and can be replaced by a plurality of separate wedge sections.

A spindle 17 is threaded in a fixed lug 18 and in a lug 19 carried on the plate 7 so that this spindle can be rotated to displace the upper wedge 8 along the lower wedge 6.

In addition the plate 7 is formed with teeth 20 that mesh with teeth 21 of a plate 10 formed with vertical slots 22 in which are seated bolts 23 that can be loosened to allow vertical displacement of this plate 10 and tightened to hold it in place. The tooth 20 and 21 are spaced by a longitudinal dimension which corresponds to the longitudinal displacement necessary to raise or lower the upper surface 8*a* by 0.1 mm.

As seen in FIG. 2 the upper wedge 8 is of right trapezoidal section, having a perpendicular side edge 8*c* and an inclined edge 8*d*, the latter engaging an inclined surface 24*a* of a block 24 forming part of the platen 2. The lower wedge 6 is of trapezoidal section, with its one edge 6*c* fitting in a cutout 25 of the plates 16 and plate 17 and its other edge 6*d* fitting fluslhly against the edge 24*a*. Thus the lower wedge 6 will be clamped tightly in place but the upper wedge 7 will be able to move longitudinally in direction 15 without binding.

With the system according to the instant invention, therefore, the spacer bars 3 are chosen in accordance with the thickness of board to be produced. As the boards are normally produced in only several standard thicknesses, this means that only several standard sets of spacer bars 3 need be provided for each press. The adjuster bar 5, however, can be relatively easily set, and in very fine steps, for virtually any finish increment. Since the finish increment depends on workpiece type, not workpiece thickness, this means that the finish increment need only be reset when the type of workpiece being pressed is changed. Furthermore since the plane 9 lies at only a very small angle to the surfaces 1*a* and 2*a*, the component of force in the direction 15 tending to maladjust the adjustment bar 5 will be very small. In fact, it is so very small that it is not normally capable of overcoming sliding friction between the surfaces 6*a* and 8*b*.

I claim:

1. A platen press comprising:

a pair of platens having respective confronting and parallel platen surfaces and each having a pair of longitudinal edges;

respective solid spacer bars fixed to said longitudinal edges of one of said platens and having respective spacer surfaces parallel to and between said platen surfaces;

means for releasably securing said spacer bars to the respective longitudinal edges;

respective adjustment bars secured to said longitudinal edges of the other of said platens and each having an adjustment surface parallel to and confronting the respective spacer surface, each of said adjustment bars being formed of an outer wedge having a pair of nonparallel faces one of which is the respective bar surface, and of an inner wedge having an outer face flatly engaging the other face of the respective outer wedge;

means for relatively longitudinally displacing said inner and outer wedges and thereby displacing the respective adjustment surfaces perpendicular to the respective platen surfaces; and means for displacing said platens toward each other perpendicular to said surfaces for engagement of said spacer surfaces flatly with the respective adjustment surfaces.

2. The press defined in claim 1 wherein said other and outer faces are inclined to said surfaces.

* * * * *